(12) United States Patent
Testa et al.

(10) Patent No.: US 9,197,438 B2
(45) Date of Patent: Nov. 24, 2015

(54) PACKET FORWARDING NODE

(75) Inventors: Patrizia Testa, Valamontone (IT);
Angelo Germoni, Anguillar Sabazia (IT); Marco Listanti, Rome (IT);
Roberto Sabella, Grottaferrata (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 609 days.

(21) Appl. No.: 13/515,469

(22) PCT Filed: Dec. 18, 2009

(86) PCT No.: PCT/EP2009/067483
§ 371 (c)(1),
(2), (4) Date: Aug. 20, 2012

(87) PCT Pub. No.: WO2011/072748
PCT Pub. Date: Jun. 23, 2011

(65) Prior Publication Data
US 2012/0314703 A1    Dec. 13, 2012

(51) Int. Cl.
*H04L 12/28* (2006.01)
*H04L 12/42* (2006.01)
*H04L 12/721* (2013.01)

(52) U.S. Cl.
CPC ............ *H04L 12/2852* (2013.01); *H04L 12/42* (2013.01); *H04L 45/38* (2013.01)

(58) Field of Classification Search
CPC ............................ H04L 45/16; H04Q 11/0066
USPC ................................. 370/236, 390; 398/45, 83
See application file for complete search history.

(56) References Cited

U.S. PATENT DOCUMENTS

| | | | | |
|---|---|---|---|---|
| 5,132,792 | A * | 7/1992 | Yonemitsu et al. | 375/240.16 |
| 8,218,440 | B2 * | 7/2012 | Dai | 370/235 |
| 2002/0186694 | A1 * | 12/2002 | Mahajan et al. | 370/390 |
| 2004/0258407 | A1 * | 12/2004 | Maciocco et al. | 398/45 |

(Continued)

OTHER PUBLICATIONS

PCT International Search Report, mailed Sep. 13, 2010, in connection with International Application No. PCT/EP2009/067483.

(Continued)

*Primary Examiner* — Andrew Lai
*Assistant Examiner* — Chuong M Nguyen
(74) *Attorney, Agent, or Firm* — Leffler Intellectual Property Law, PLLC

(57) ABSTRACT

A packet forwarding node of a transport network performs a first packet forwarding mode in which received packets are processed and forwarded on a per-packet basis. The forwarding node performs a second packet forwarding mode when the node identifies a group of consecutive packets. The group of packets are destined for the same destination node of the transport network. The second packet forwarding mode comprises determining a forwarding treatment for the group of packets and forwarding the group of packets with the determined treatment. The forwarding is performed without processing the headers of at least some of the packets in the group. The group of consecutive packets is identified by a control packet preceding the group or by inter-packet signalling which indicates that the packet before the inter-packet signalling and the packet after the inter-packet signalling are to be treated as part of the same group. Packets which are determined to be received on transit channels can be forwarded without processing headers of individual packets.

16 Claims, 11 Drawing Sheets

(56) References Cited

U.S. PATENT DOCUMENTS

2004/0258411 A1* 12/2004 Al-Salameh et al. ........... 398/83
2005/0030898 A1* 2/2005 Furlong et al. ................ 370/236

OTHER PUBLICATIONS

"Etherburst Packet WDM System Overview" Matisse Networks White Paper, 2008.
MEF Technical Specification MEF 6.1 "Ethernet Services Definitions Phase 2", The Metro Ethernet Form, Apr. 2008.
"The Optical Switching Revival: Rebuilding Optical Networks for Packets" Heavy Reading, vol. 7, No. 3, Mar. 2009.
"OTN Outperforms SONET/SDH" Ciena Corporation White Paper, 2007. WP047A49.2007.
ITU-T G.709/Y.1331 Series G: Transmission Systems and Media, Digital Systems and Networks, Digital terminal equipments—General; Series Y: Global Information Infrastructure, Internet Protocol Aspects and Next-Generation Networks, Internet protocol aspects—Transport; Interface for the Optical Transport Network (OTN), Dec. 2009.
IEEE Standard 802.1 Qay "IEEE Standard for Local and metropolitan area networks—Virtual Bridged Local Area Networks Amendment 10: Provider Backbone Bridge Traffic Engineering", Aug. 5, 2009.
IEEE Standard 802.3 "Telecommunications and information exchange between systems—Local and metropolitan area networks—Specific requirements; Part 3: Carrier sense multiple access with Collision Detection (CSMA/CD) Access Method and Physical Layer Specifications", Dec. 26, 2008.

* cited by examiner

PACKET FORWARDING NODE

TECHNICAL FIELD

This invention relates to a packet forwarding node, such as an Ethernet forwarding node, a communication system with packet forwarding nodes, and to methods of operating the nodes and network.

BACKGROUND

Telecommunication networks are evolving due to the ever increasing variety of types of traffic that must be carried, such as broadcast and multicast services (e.g. Internet Protocol Television (IPTV), pay-per-view services, video on demand, gaming, high-definition personal video conferencing) as well as more conventional traffic types. The need to deliver such services requires a transport architecture based on a single network infrastructure, since the cost of operating and maintaining multiple service-specific networks is untenable.

In metro networks, there is a gradual migration from legacy Synchronous Digital Hierarchy (SDH)/Asynchronous Transfer Mode (ATM) technology towards solutions based on a combination of emerging Carrier Ethernet technologies such as Provider Backbone Bridge Traffic Engineering (PBB-TE, IEEE 802.1Qay) and Multi-Protocol Label Switching Transport Profile (MPLS-TP), with an intelligent optical transport layer, based on the Optical Transport Network (OTN) G.709 standard, supporting wavelength and sub-wavelength switching. While this approach allows a range of different traffic types to all be carried in a similar manner, within Ethernet frames, a significant amount of processing is required at each packet-forwarding node. Each node maintains a forwarding information base (FIB) which instructs the node where to forward each received packet. Every time a packet is received at the node, a header of the received packet is inspected and a look-up operation is performed in the forwarding information base. The forwarding should be performed as quickly as possible to minimise forwarding delay. It can require significant processing resources at a node to provide a suitable forwarding performance. Another disadvantage of this architecture is that it requires the complex OTN multiplexing hierarchy and a multi-layer switching structure, which results in an expensive network solution with limited scalability and flexibility.

SUMMARY

An aspect of the present invention provides a method of forwarding packets at a packet forwarding node of a transport network. The method comprises performing a first packet forwarding mode comprising receiving packets and, for each packet, processing the header of the packet to determine a forwarding treatment for the packet and then forwarding the packet. The method further comprises performing a second packet forwarding mode when the node identifies a group of consecutive packets destined for the same destination node of the transport network. The second packet forwarding mode comprises determining a forwarding treatment for the group of packets and forwarding the group of packets with the determined treatment. For at least a sub-set of the group of packets, the forwarding is performed without processing the headers of the sub-set of packets. The group of consecutive packets are identified by at least one of: receiving a control packet preceding the group which indicates the number of packets in the group and inter-packet signalling which indicates that the packet before the inter-packet signalling and the packet after the inter-packet signalling are to be treated as part of the same group.

The method reduces the amount of processing of individual packets at the forwarding node, such as the number of accesses to a forwarding information base (FIB) and classification table. This improves throughput at the node. Operations such as classification, queuing and scheduling can be performed on the basis of a group, rather than a single packet.

The control packet can carry an address of the destination node on the transport network for the group of packets. In this case, the step of determining a forwarding treatment for the group of packets can use the address in the control packet without needing to inspect a header of any of the individual packets in the group. If inter-packet signalling is detected, but no control packet precedes the group of packets, the method can inspect a header of a packet (e.g. the first packet) in the group to determine a forwarding treatment for the group of packets.

The step of determining a forwarding treatment can comprise determining a destination port of the node, and may also determine how the packet, or group of packets, is to be queued. The forwarding treatment can use a flow identifier and/or a class of service identifier carried by the control packet, or an individual packet.

Advantageously, if the control packet is not received the method further comprises creating a new control packet before forwarding the group of packets. This improves forwarding efficiency at subsequent nodes of the transport network.

Advantageously, the node comprises input interfaces and output interfaces and further comprises storing a channel allocation table (CAT) at the node which indicates which input interface is a transit channel for the node. Packets for the transit channel are forwarded without processing the headers of packets of that channel. Packets for the transit channel are forwarded to an output interface corresponding to the transit channel. This further reduces the amount of processing at the node.

Another aspect of the invention provides a method of forwarding packets at a forwarding node of a transport network. The method comprises receiving packets comprising a header and determining a group of packets which are destined for the same destination node of the transport network and which can receive the same forwarding treatment at subsequent nodes of the transport network. The method forwards the group of packets as a consecutive group of packets. The group is identified by at least one of: creating a control packet preceding the group which indicates the number of packets in the group; and adding inter-packet signalling which indicates that the packet before the inter-packet signalling and the packet after the inter-packet signalling are to be treated as part of the same group.

Another aspect of the invention provides a method of forwarding packets at a packet forwarding node of a transport network. The node comprises input interfaces and output interfaces and interfaces with other nodes on the transport network and a local network. The method comprises storing a channel allocation table at the node. The channel allocation table indicates which input interface is a transit channel for the node and specifies an interface to which packets should be forwarded. The transit channel only carries packets that are destined for another node on the transport network. The method performs a first forwarding mode comprising receiving packets on the input interfaces, and, for each packet, processing the header of the packet to determine a forwarding treatment for the packet and then forwarding the packet. The method performs a second forwarding mode when a packet is received on an input interface which is a transit channel. The second forwarding mode comprises forwarding packets for the transit channel without processing the headers of packets of that channel. Packets for the transit channel are forwarded to an output interface corresponding to the transit channel.

This aspect allows a forwarding node to determine and, cut-through, channels carrying traffic that does not need to be processed at the node. This can significantly reduce the amount of packet processing performed at the forwarding node. A "channel" can correspond to an optical wavelength channel used on a fibre or to a particular fibre (where a bundle of fibres are used without wavelength multiplexing).

Features of the aspects of the invention can be combined. All aspects of the invention are solutions to the problem of increasing throughput in a forwarding node.

In contrast to packet optical transport network solutions based on multi-layer switching technologies, including an OTN switching layer, embodiments of the invention provide a more scalable and flexible solution to transport networks. Advantageously, embodiments use Ethernet technology that is simple and low cost and is interoperable with Ethernet connection-oriented technologies.

The term "packet" used in this specification can encompass packets, frames, cells and any protocol data units which carry a payload of traffic and have an overhead section indicating the destination of the data unit. In an advantageous embodiment of the invention, the "packet" is a Layer 2 data frame, such as an Ethernet frame.

Further aspects of the invention provide apparatus for performing the methods. An aspect of the invention provides a packet forwarding node for a transport network comprising input interfaces for receiving packet traffic and output interfaces for outputting packet traffic. A switching fabric connects the input interfaces and output interfaces. A packet processor is arranged to perform a first forwarding mode comprising receiving packets and, for each packet, processing the header of the packet to determine a forwarding treatment for the packet and then forwarding the packet. The packet processor is also arranged to perform a second forwarding mode comprising identifying a group of consecutive packets which are destined for the same destination node of the transport network, determining a forwarding treatment for the group of packets, forwarding the group of packets with the determined treatment and, for at least a sub-set of the group of packets, the forwarding is performed without processing the headers of the sub-set of packets. The group of consecutive packets is identified by at least one of: receiving a control packet preceding the group which indicates the number of packets in the group; and inter-packet signalling which indicates that the packet before the inter-packet signalling and the packet after the inter-packet signalling are to be treated as part of the same group.

Another aspect of the invention provides a packet forwarding node for a transport network comprising input interfaces for receiving packet traffic, output interfaces for outputting packet traffic and a switching fabric connecting the input interfaces and output interfaces. A packet processor is arranged to determine a group of packets which are destined for the same destination node of the transport network and which can receive the same forwarding treatment at subsequent nodes of the transport network. The packet processor is further arranged to forward the group of packets as a consecutive group of packets and identify the group by at least one of: creating a control packet preceding the group which indicates the number of packets in the group; and adding inter-packet signalling which indicates that the packet before the inter-packet signalling and the packet after the inter-packet signalling are to be treated as part of the same group.

Another aspect of the invention provides a packet forwarding node for a transport network comprising input interfaces for receiving packet traffic, output interfaces for outputting packet traffic and a switching fabric connecting the input interfaces and output interfaces. A store is provided for storing a channel allocation table which indicates which input interfaces is a transit channel for the node and specifying an interface to which packets should be forwarded. The transit channel only carries packets that are destined for another node on the transport network. A packet processor is arranged to perform a first forwarding mode comprising receiving packets on the input interfaces, and, for each packet, processing the header of the packet to determine a forwarding treatment for the packet and then forwarding the packet. The packet processor is also arranged to perform a second forwarding mode when a packet is received on an input interface which is a transit channel. The second forwarding mode comprises forwarding packets for the transit channel without processing the headers of packets of that channel, packets for the transit channel being forwarded to an output interface corresponding to the transit channel.

The packet forwarding nodes are further arranged to perform any of the described or claimed method steps.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
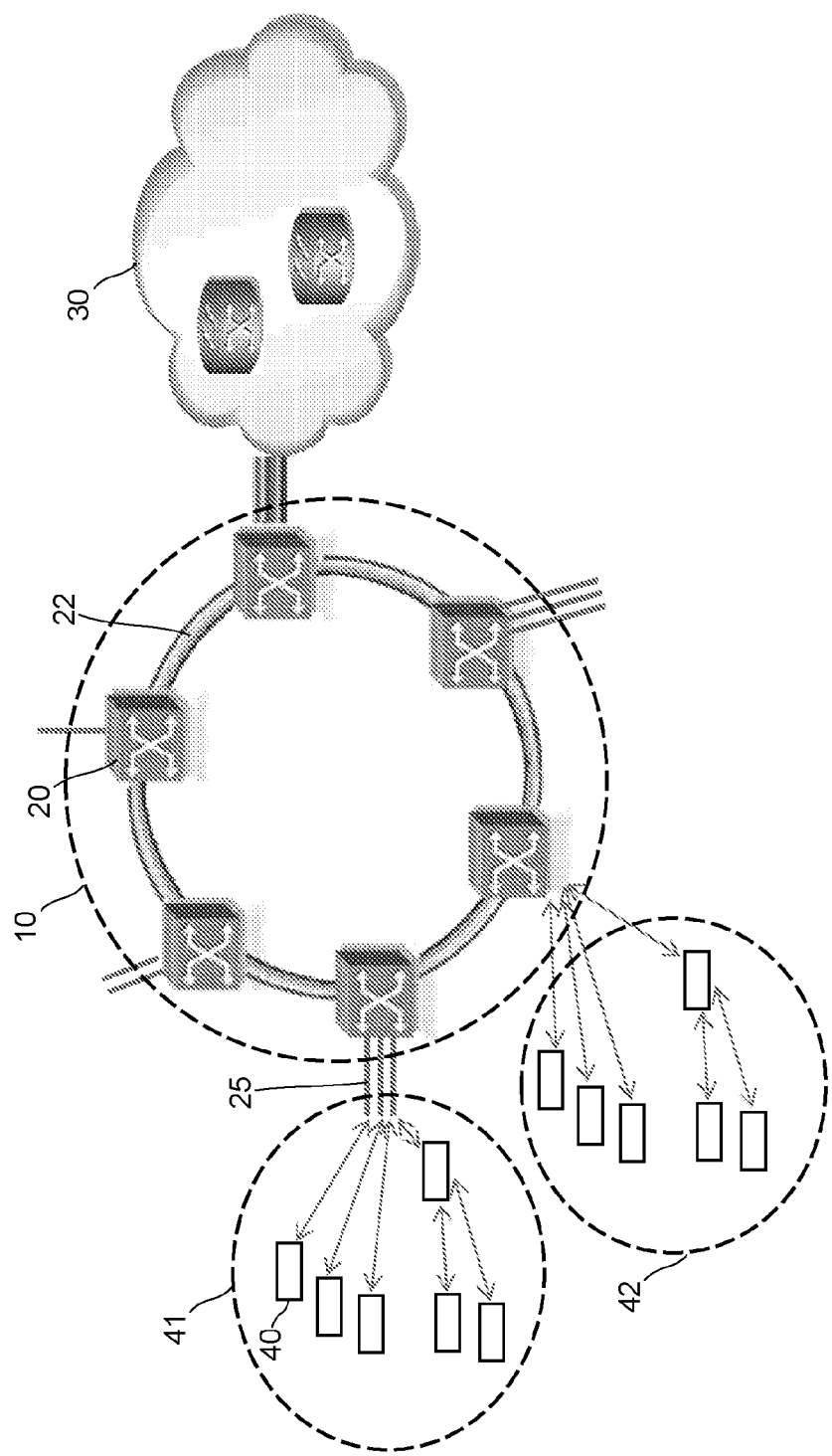
FIG. 1 shows a packet-based transport network according to an embodiment of the invention.

FIG. 1 shows an example of a communication network 10 in accordance with an embodiment of the present invention. The network 10 comprises a plurality of nodes 20. FIG. 1 shows a network 10 with a ring topology, although the network 10 can have other topologies, such as a mesh topology. The network 10 has a packet-based transport layer and nodes 20 forward (switch) packets between input and output ports of the node based on an address carried in a header of each packet. In FIG. 1 the network 10 is a metro network with nodes 20 connecting 25 to access networks 41, 42. Metro network 10 also connects to other metro networks/core networks 30. The physical layer connecting nodes 20 in network 10 is optical, and typically the links 22 between network nodes 20 are wavelength division multiplexed (WDM), or dense wavelength division multiplexed (DWDM), optical links with a set of wavelength channels carried over one or more optical fibres.

Figure 2:
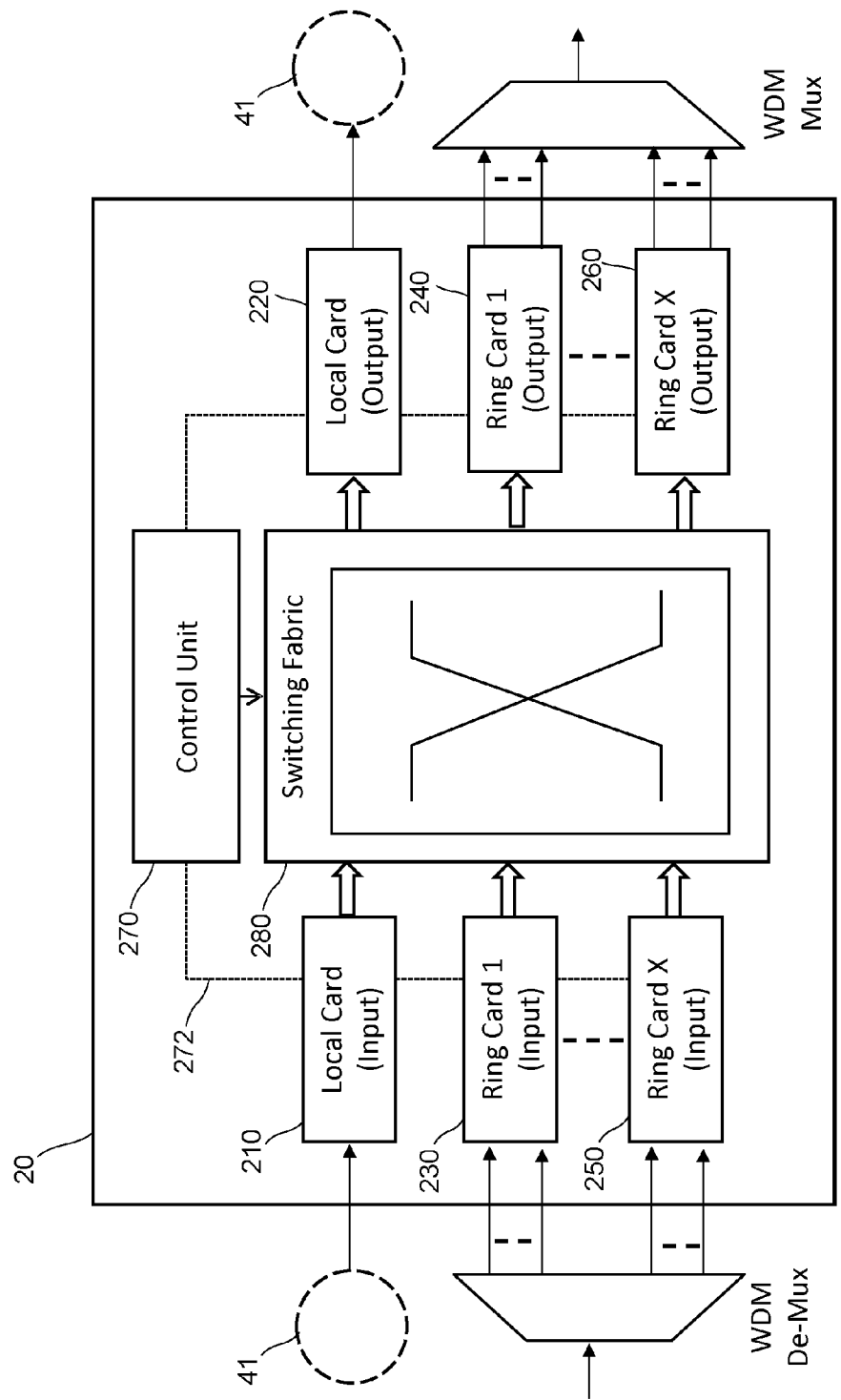
FIG. 2 shows a node in the packet-based transport network of FIG. 1.

FIG. 2 shows an overview of apparatus at one of the transport nodes 20. With reference to the metro network scenario of FIG. 1, each transport node 20 has a set of line cards, each having an input section 210, 230, 250 and an output section 220, 240, 260. One or more of the line cards connect to local networks 41, 42. Ports in the input and output sections 210, 220 of a line card connect to links to the local network 41 served by the node 20. The node 20 can connect to multiple local networks 41, 42. The line cards connected to local networks 41, 42 will be called local cards. Each transport node 20 also has line cards each having an input section 230, 250 and an output section 240, 260 with ports connected to other nodes 20 on the ring. These will be called ring cards. Nodes 20 in the network 10 can also connect to other metro/core networks, and the node can have line cards (not shown) for connecting to the other metro/core networks.

Figure 3:
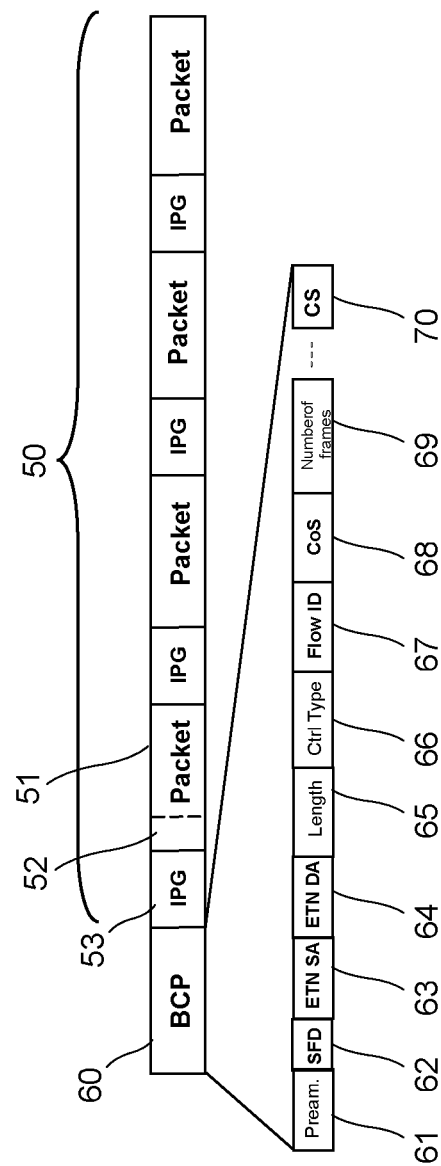
FIG. 3 shows a format of a group/burst of packets transmitted within the network of FIG. 1.

Before explaining the line cards in more detail, the format of a burst of packets is shown in FIG. 3. A burst 50 comprises at least two packets or frames 51. The format of each packet 51 is conventional, such as an Ethernet frame. The number of packets in the burst 50 can be any number having a value greater than two, although advantageously is a large number. The size of a burst will depend on factors such as delay and jitter requirements of the specific traffic flow. Advantageously, the number of packets in each burst is variable, i.e. each burst created in the network does not have to consist of the same number of packets. A burst 50 of packets is preceded by a burst control packet (BCP) 60. The burst control packet 60 travels along the same optical channel as packets 51. An example format of the burst control packet 60 is shown in FIG. 3. In this example the burst control packet 60 has the Ethernet frame format, and includes a preamble 61 start frame delimiter (SFD) and a check sequence 70 which allows a MAC Ethernet de-framer to process the packet. The burst control packet 60 comprises a source address 63, a destination address 64 and a field 69 indicating the number of packets in the burst. Optionally, the gap between each packet can include an inter-packet gap 53 which is coded in a distinctive manner. The inter-packet gap 53 signals to a node 20 that the packet preceding the inter-packet gap 53 and the packet following the inter-packet gap 53 form part of the same burst of packets. Advantageously, a burst 50 has a burst control packet 60 and an inter-packet gap 53 between each packet 51. The source address 63 and destination address 64 refer to nodes on the transport network 10, i.e. to a source node 20 on network 10 where the burst was created and to a destination node 20 on network 10 where the burst should be delivered. Other fields within the burst control packet 60 include: a preamble 61; a start frame delimiter (SFD) 62; a length field 65) and a Control type field 66. For a standard Ethernet control frame the length field can be used to indicate the protocol control type, i.e. identifies the burst control packet, and so the subsequent control type field is not necessary. Both the length field 65 and control type field 66 are present in the header of the control packet 60 if a proprietary control packet (i.e. not Ethernet) is used. The Control type field 66 signals that the packet 60 is a burst control packet. A Flow ID field 67 identifies a traffic flow within a flow generally defined by the triple: source transport node, destination transport node and Class of Service (CoS). It is useful in cases where it is required to differentiate multiple traffic flows between the same transport node SA and transport node DA and with the same CoS. The burst control packet 60 also includes a Check Sequence (CS) 70 for the contents of the burst control packet, and allows a receiving node to check if the BCP has been corrupted during transmission.

Any node 20 in network 10 which has a number of waiting packets to send to the same destination node 20 on the transport network 10 can form a burst and send the burst across the network 10. A burst is formed by creating a burst control packet 60 and sending the burst control packet 60 immediately before the burst of packets. The burst of packets are sent contiguously in time. Advantageously, the inter-packet gap between each packet of the burst is coded in a distinctive manner, using a pattern of idle bits. Ethernet standard IEEE 802.3 defines that Ethernet frames must be separated by an inter frame gap with minimum size of 96 bit time. The inter-packet gap can be coded using any suitable bit pattern which is known by sending and receiving nodes.

At a subsequent node 20 along the path of the burst of packets, a node 20 can inspect the burst control packet 60 to determine where the burst of packets needs to be forwarded, without inspecting headers of individual packets.

Figure 4:
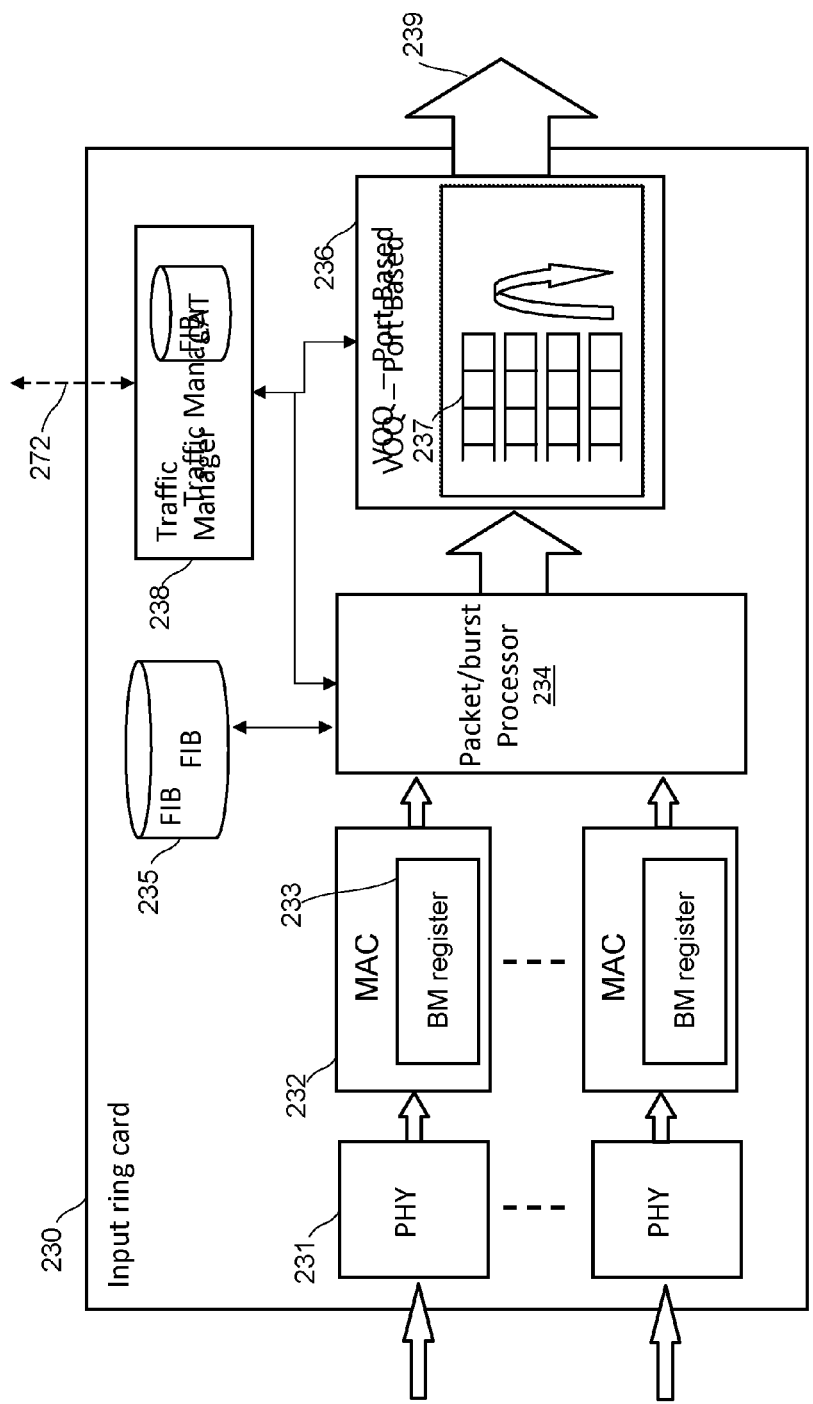
FIG. 4 shows an input section of a ring line card in the node of FIG. 2.

FIG. 4 shows an input section 230 of a ring card. The line card has a set of input ports, which each receive an input from a wavelength demultiplexer. Each input port corresponds to an optical wavelength channel used on an optical link. Each input port has a physical layer line (PHY) interface unit 231. The line interface 231 converts the incoming optical signal from a format used on the communication link to a baseband electrical digital signal which can be used by the following stages. Unit 231 demodulates the received optical signal and also decodes the demodulated signal to remove any line coding used during transmission. The demodulated and decoded signal is forwarded to a MAC unit 232. MAC unit 232 performs a de-framing operation, identifying packets or frames in the signal generated by the physical layer interface unit 231. In a conventional manner, MAC unit 232 determines if the value carried in the check sequence field of a packet (70, FIG. 3) matches the decoded contents of the packet. Packets which do not match are discarded. The PHY unit 231 inspects the gap between packets/frames and identifies any inter-packet gap which contains distinctive signalling indicative of two adjacent packets forming part of a burst of packets. When the distinctive signalling is identified, it signals such a network status to the MAC unit 232 and the MAC unit 232 increments a Burst Mode (BM) register 233. If the BM register 233 has a value=0 then it indicates the current received packet does not form part of a burst with the previously received packet. If the BM register 233 has a non-zero value, the value indicates the number of packets in the burst.

Packets/frames are output to a packet/burst processor 234. For an individual packet, unit 234 processes the packet by looking up the destination address and the Class of Service (CoS) fields carried in the packet header 52 in a Forwarding Information Base (FIB) 235. For example, a packet received at a ring card from another node on the ring may be destined for a node on the access network 41 connected to a local line card 220 at the node 20 or may be destined for another node 20 on the ring network 10. In contrast with a conventional packet-forwarding node, node 20 does not process every packet arriving at a line card of the node 20. Processor 234 operates differently under certain conditions. Firstly, if a burst of packets is detected by processor 234 the processor does not process all of the individual headers of packets in the burst. Advantageously, the processor does not process any of the individual headers of packets in the burst if the burst control packet 60 is uncorrupted. Secondly, if a particular wavelength channel is being used as a transit channel through the node, unit 234 does not process individual packet headers on that channel. Traffic manager 238 stores a channel allocation table (CAT) which determines how traffic is allocated to wavelength channels. Information retrieved from the FIB 235 determines where an individual packet, or burst of packets, should be forwarded to. The information will indicate a particular output port of the node 20. Packets are sent to a buffer 237 of queuing unit 236. Advantageously, queuing unit 236 is a Virtual Output Queuing unit with buffers corresponding to the output ports. Packets are forwarded 239 from a buffer 237 of unit 236, across the switching fabric 280, according to instructions received from the traffic manager 238, 242. Processor 234 also inspects other fields of a packet or burst control packet, including the FlowID (67, FIG. 3) and Class of Service (CoS) field. The values of these fields will also affect the forwarding behaviour at the node, and will determine the priority given to the traffic.

In order to assemble traffic received from access networks into bursts, in the input local card traffic is first queued according its Destination transport node and CoS and then per port VOQ. In the input ring cards bursts can be segmented or concatenated according to the available bandwidth and shaping mechanisms. The input section of a ring card de-assembles bursts destined for an access network connected to that node. It also supports transit channels, described later.

An input section 210 of a local line card of the node 20 has a similar form as the input section 230 of a ring line card. Additionally, the input section of the local card assembles bursts of traffic received from an access network and so it has a two-level queuing scheme, with a first level handling packets and a second level handling bursts.

Figure 5:
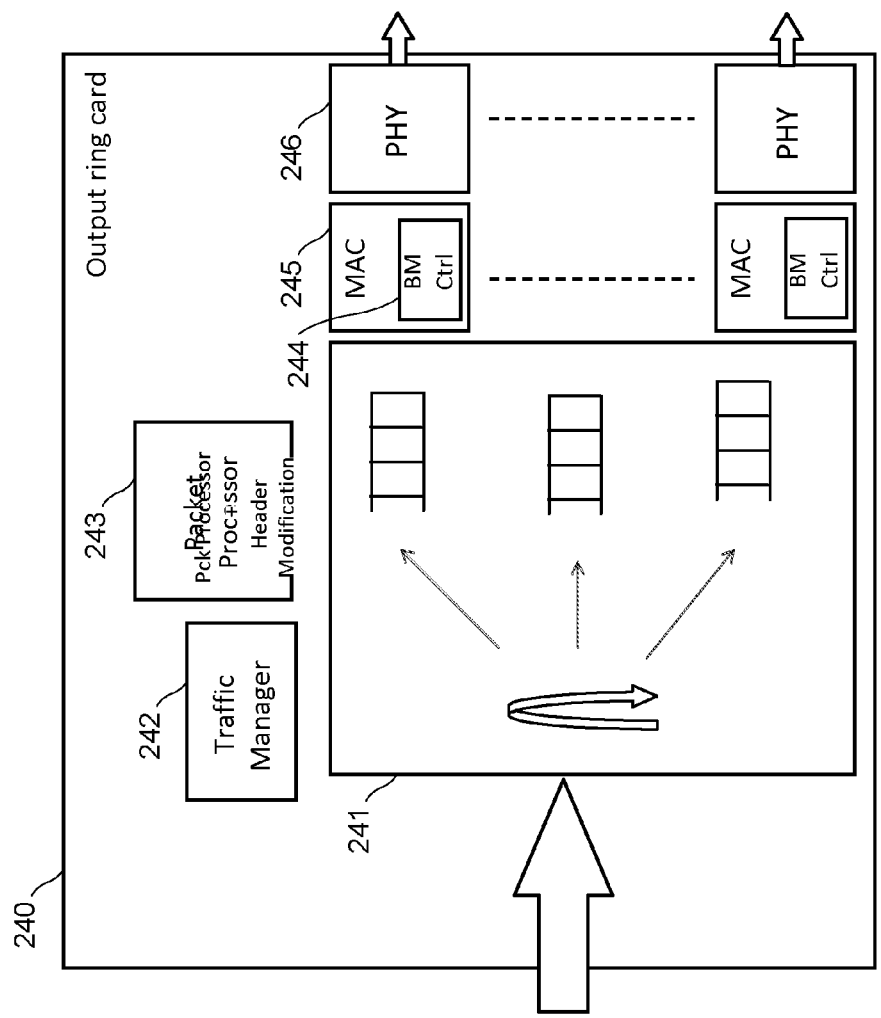
FIG. 5 shows an output section of a ring line card in the node of FIG. 2.

FIG. 5 shows an output section 240 of a ring card. Packets are received from the switching fabric by a unit 241 and buffered according to destination port. A MAC unit 244 performs a framing operation, i.e. inserting the preamble and the check sequence fields in each packet. MAC unit 245 controls the burst mode transmission. A Burst Mode Controller (BM Ctrl) 245 instructs the physical layer module PHY 246 on the beginning and the end of the burst mode transmission, and controls when the PHY unit 246 adds the distinctive bit pattern during inter-packet gaps to identify that packets form part of a burst. PHY module 246 converts the baseband electrical signal to a format (e.g. optical) used on the outgoing communication link. Typically, this comprises line coding and modulation on a wavelength channel used on an outgoing optical link. MAC unit 245 is instructed which packets form part of a group by packet processor 243.

An output section of a local line card 220 of the node 20 operates in the conventional manner of an Ethernet line card as it does not need to support management and transmission of bursts.

Packet transmission at each line card is managed by the traffic managers 238, 242. Traffic managers 238, 242 use the channel allocation table (CAT), information in the received burst control packets 60, and information about the status of the queues at each line card, which includes queue size and the type of traffic (CoS) waiting in the queues. The number of packets specified in the control packet allows the traffic manager to estimate short term load of queues at other nodes. Traffic managers 238, 242 allocate the network resources fairly to local cards and ring cards. The control unit 270 allows the line and ring cards to share the information for forwarding decisions.

Figure 6:
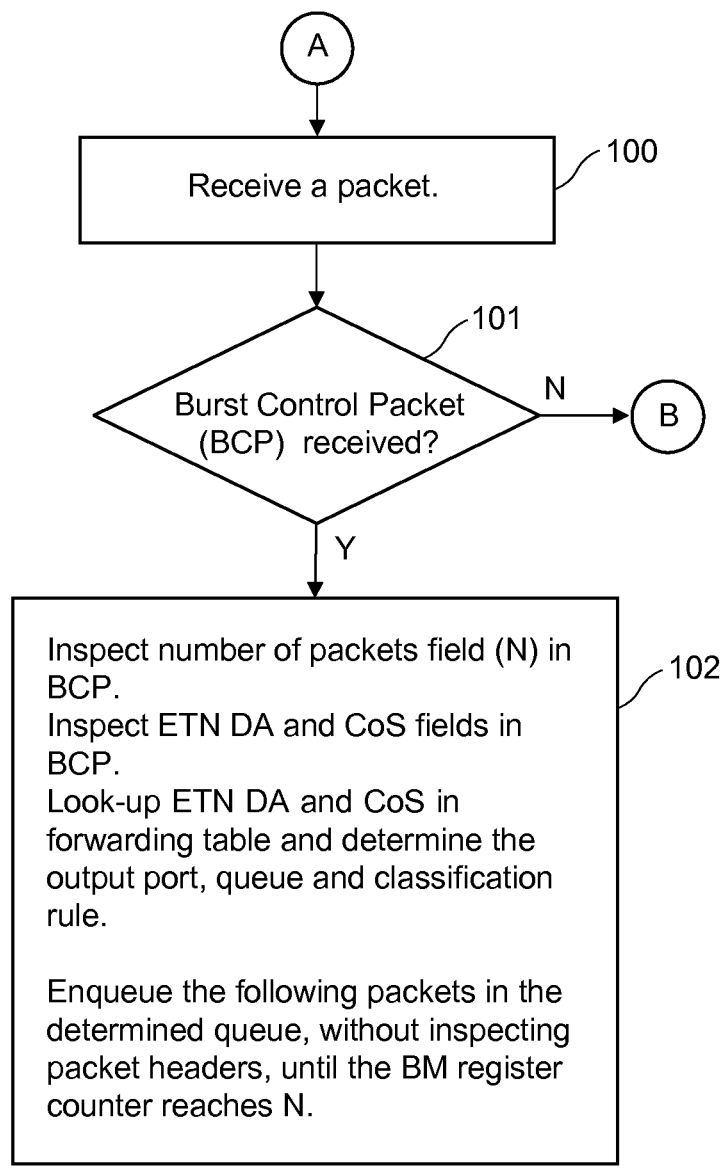
FIGS. 6 and 7 show a method of processing bursts of packets at the node of FIG. 3.
Figure 7:
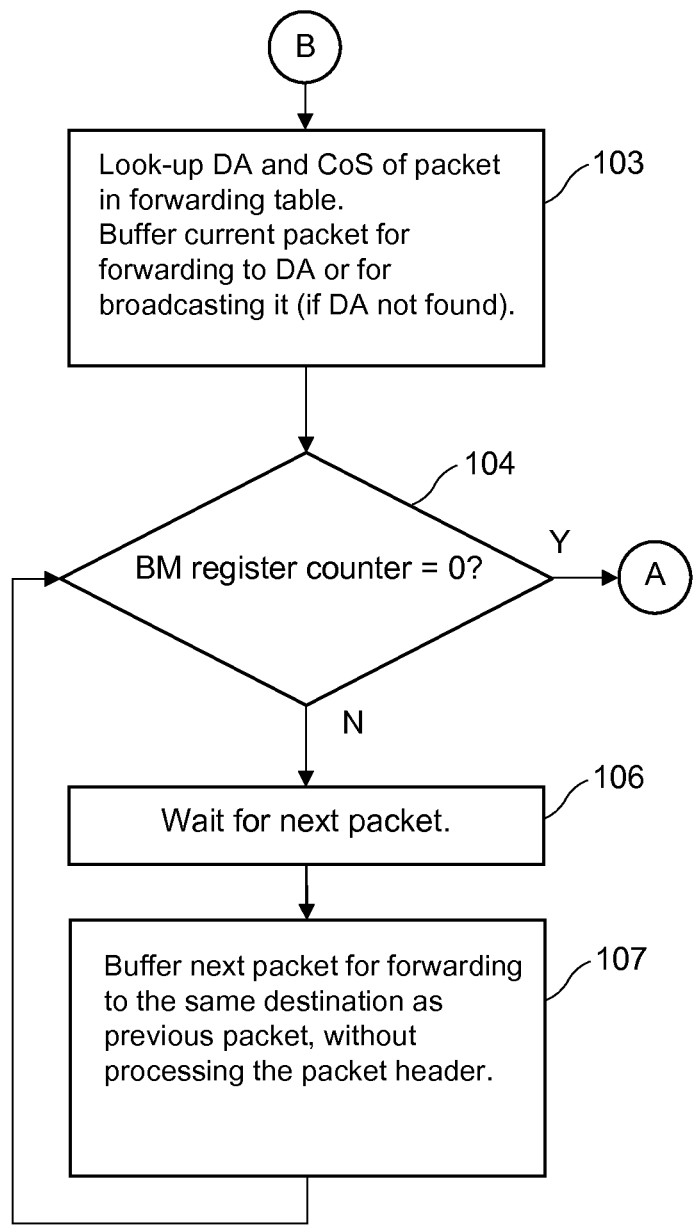

FIGS. 6 and 7 show a method of processing packets received at a node 20. The method is performed by the packet/burst processor 234 shown in FIG. 4. At step 100 a packet is received at a line card of the node. Step 101 checks if the packet is a burst control packet (BCP). If a burst control packet has been received, the method proceeds to step 102 and inspects the information fields within the BCP. The BCP indicates the number of packets (N) in the burst and also indicates the destination address 64 of a transport node in the network 10. A forwarding table is used to look up the destination address 64 carried in the BCP header and determine an output line card for that destination address. The output line card can be a local line card for traffic which is being sent to an access network 41, or a ring line card for "through" traffic which is being forwarded to another node in the network. The next N packets are forwarded to the determined output line card. Packets are enqueued on the basis of destination address and CoS and are forwarded to the output line card when permitted by the traffic manager 238. The process performed at step 102 avoids the need to process the header of each individual packet within the burst. Only the BCP header is inspected and processed, and this provides the processor 234 with all information needed to decide on a forwarding treatment for the burst of packets.

Returning to step 101, if a burst control packet was not received then the current packet may either be an isolated packet, or a packet which forms part of a burst which has suffered a corrupted or missing burst control packet. The method proceeds to FIG. 7. At step 103 the header of the current packet is inspected. A forwarding table FIB is used to determine an output line card for the destination address carried in the packet header. If the FIB at the node does not store the required information, then the node buffers the packet in a queue dedicated to broadcast traffic. If packet loss caused by transmission errors is acceptable for the particular class of service (CoS), a further possibility is to simply discard a burst of data frames in order to simplify the process. A further possibility is to forward each of the packets in the burst after individually processing the packet headers.

Step 104 checks if the BM register is zero. The value held in the BM register indicates if the inter-packet gap included distinctive signalling to indicate that the current packet and the next packet form part of a burst. If the distinctive signalling is not found (i.e. BM register=0), then the current packet is determined to be an isolated packet and is forwarded as normal to the output line card determined at step 103. If distinctive signalling is found at step 104 (i.e. BM register has a non-zero value), the method proceeds to step 106. The next packet is considered to form part of the same burst as the current packet and is therefore also buffered for forwarding to the same destination as the previous buffered packet. The header of the next packet is not processed.

To summarise the method shown in FIGS. 6 and 7, the forwarding node is capable of two different modes of operation. In a first mode of operation, the packet forwarding node receives an individual packet (step 100) and the header of the packet is processed (step 103) to determine the forwarding treatment for the packet. This is repeated for each individual packet. This is the normal behaviour of a packet forwarding node. In a second mode of operation, the packet forwarding node identifies a group of packets and then forwards the group of packets with the same forwarding treatment, without needing to individually process headers. The group is identified either by a control packet (step 101) or by distinctive inter-packet signalling (step 104).

FIG. 7 shows a situation where a burst control packet is not present, but a group of packets are recognised as being part of a burst due to the distinctive inter-packet signalling. A burst control packet can become corrupted or lost for various reasons. Advantageously, a new burst control packet is created before the burst of packets are sent from the node to simplify recognition and processing of the burst at subsequent nodes of the network 10. The new burst control packet is sent from the node, followed by the buffered packets. The new burst control packet carries a destination address of a transport node on the network 10 (64, FIG. 3) or the broadcast address if the association between local MAC address and transport destination address is not known.

The node inspects the destination address in the header of the first packet 50. In a network 10 using MAC-in-MAC (i.e. a customer packet is encapsulated within a packet having an outer header) the destination address in the header of the first packet 50 will correspond to a transport node, and this can be used as the destination address within the new burst control packet. In a network 10 not using MAC-in-MAC the destination network address carried in a packet typically corresponds to a device in one of the access networks (e.g. a device on access network 41). The node attempts to determine an association between the local address (i.e. the address of the end device on the local network) retrieved from the header of a packet 50 and the transport node address (i.e. the address of a transport node serving that end device). One way of determining this association is by using multicast protocols such as the Address Resolution Protocol (ARP) used to determine the association between IP and MAC Ethernet addresses. This is explained further using the simple ring network shown in FIG. 8. Consider that node A does not know the association between a local MAC destination address of an arriving packet and its destination metro transport node MAC address. Node A sends, in multicast, a control frame asking to transport nodes which of them has the local station with the MAC address specified in the control frame in a subnetwork connected to one of its ports. The transport node D which connects such a subnetwork replies, indicating its own MAC address. The association discovering function is performed by the local card of node A that needs the information to assemble the burst.

Burst forwarding and processing process in the case where the control packet is lost and no association between local and transport MAC destination addresses is found will now be described. Consider that node C drops the BCP of a burst because it is corrupted. The ring card receiving the packets inspects the MAC destination address field of the first uncorrupted packet and looks in the association database. If it finds the association, it assembles a new burst (with the MAC address D in destination MAC field of the BCP) and sends it on the ring. If it does not find the association, it sends data frames in broadcast to its local cards and, at the same time, it assembles them in a burst with a new BCP carrying its own ring node address as source address and the broadcast address as destination address and forwards the burst on the ring. The node D (and also nodes A and B) will process the burst and send it again on the ring (seeing the broadcast address in the BCP destination field). The burst will be discarded (i.e. removed from the ring) by the node C that sees its own MAC address in the BCP.

Figure 9:
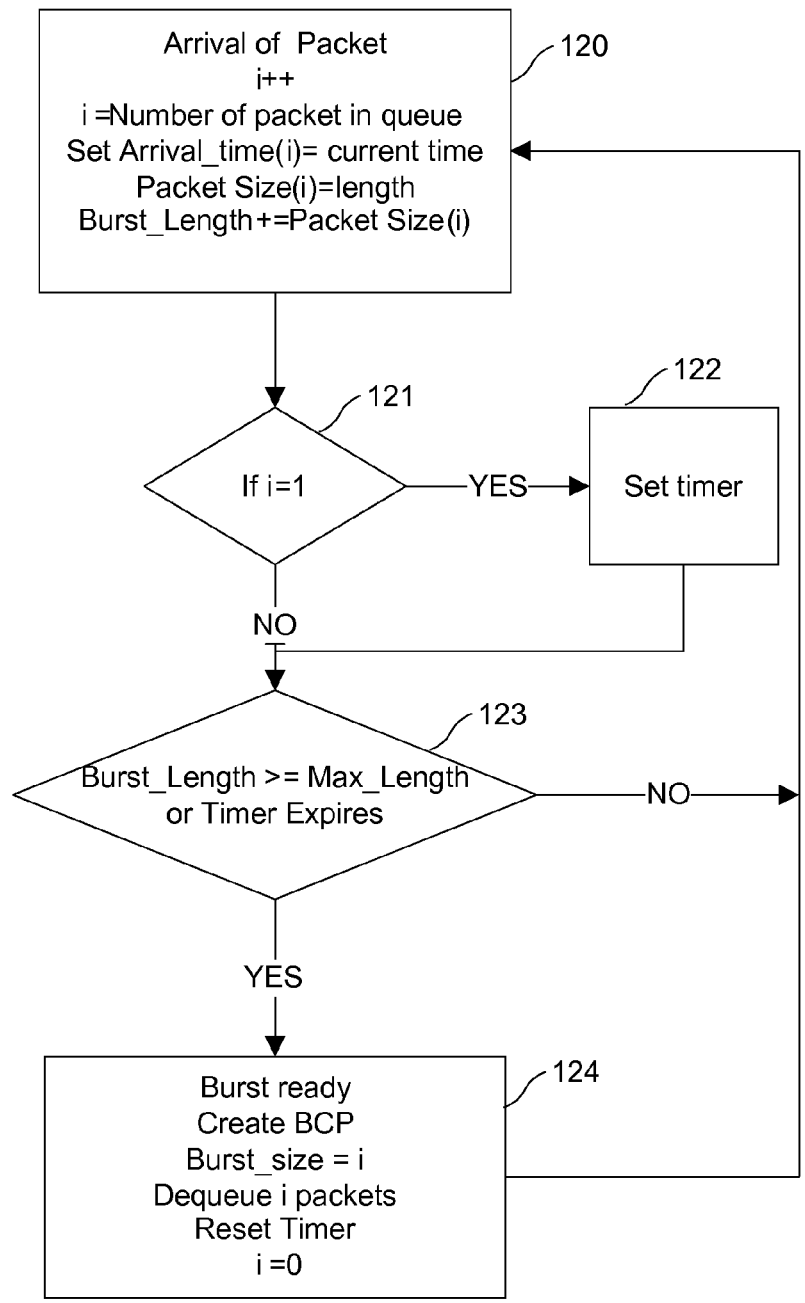
FIG. 9 shows a method of assembling packets in bursts.

A burst of packets can be created at a node 20 of network 10 at which traffic is first received from an access network 41, or at any other node 20 in network 10. A burst of packets is created by the packet processor of the input local card. FIG. 9 shows an example of a method of aggregating packets into a burst of packets. At step 120 a packet is enqueued for transfer to a particular destination. If this is the first packet in the queue then a timer is set at step 122. The maximum size of a burst can be defined in terms of a number of packets, a timer duration, or both of these parameters. Step 123 checks if the burst parameters have been met. If not, the method returns to step 120 to await the arrival of a new packet. If the burst parameters have been met, the method proceeds to step 124. A burst control packet (BCP) is created with the destination address, number of packets in the burst, class of service (CoS) and other fields shown in FIG. 3. The newly created burst of packets are forwarded from the buffer and the counter and timer are reset. The burst of packets are forwarded as a consecutive group of packets across the network.

Advantageously, nodes 20 in the network 10 use suitable shaping and scheduling mechanisms to limit delay and jitter. Scheduler mechanisms on the basis of the available bandwidth can control and change the size of bursts transmitted at each node. In case of congestion, a large burst can be segmented into multiple bursts. Each segmented burst is preceded by a burst control packet having a field with the updated number of packets in that segment so as to allow to process correctly data packets at the receiver. The number of packets assembled in the next burst to be transmitted can be determined on the basis of the bandwidth granted to that flow from the output scheduler. Burst segmentation can be minimised if flows are opportunely shaped.

Figure 8:
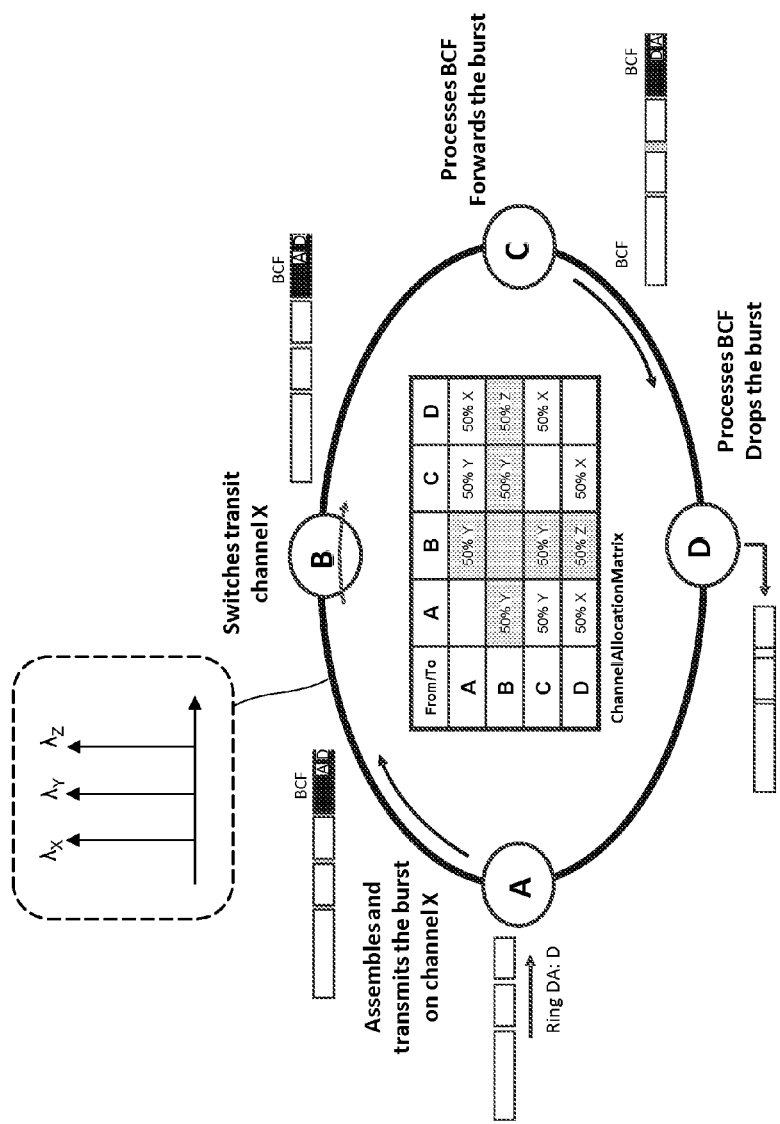
FIG. 8 shows allocation of optical channels to traffic in an example network.

In an advantageous embodiment, nodes 20 in the network 10 are connected by an optical network having a plurality of wavelength channels. The allocation of traffic to the wavelength channels is dynamic and depends on the size of the flows between transport nodes and the available channel bandwidth. Wavelength channels are allocated to particular source/destination pairs of nodes. FIG. 8 shows a simple ring network having four nodes A-D. The are three wavelength channels X, Y, Z. Each transport node 20 stores a channel allocation table (CAT) indicating how bandwidth on each channel is distributed to the connections/flows between different ring nodes. An example channel allocation table is shown. This table determines which wavelength channel should be used when sending/receiving traffic. For example, node A uses channel X when sending traffic to node D. Channel X is also used when sending traffic between node C and node D. From this table, node B knows that any traffic received on channel X from node A should be forwarded directly to node C. There is no need for node B to inspect the headers of packets received on these channels since the channel allocation table has already determined the forwarding treatment for packets. Similarly, channel Z is a transit channel for nodes C and A, and channel Y is a transit channel for the node D. Transit channel are channels among its active ones that are not present in its row and column. The table held at a node can also explicitly state which channels are transit channels at a node. The percentage values are used by a scheduler to arbitrate between different transmissions. There is a 1:1 association between a wavelength channel and a port/interface at a node. This association is stored at a node and can be stored as a physical attribute associated with a port.

The channel allocation table helps to further reduce packet processing at the node by allowing channel switching in a node, i.e. all bursts/frames of the same channel are not processed and send directly on the output wavelength. A transit channel does not contain frames destined for the node and the node is also not allowed to transmit frames on the channel. The channel allocation table allows each node to identify such channels called "transit" channel and that are cut-through (not processed).

The channel allocation table is used at a sending node to instruct the sending node which wavelength channel to use when sending packets to a particular destination node. The channel allocation table is also used at a receiving node, and instructs the receiving node which wavelength channel requires processing of individual packets, or bursts of packets i.e. some traffic is to be dropped from that wavelength channel at the node, and which wavelength channels can be cut through without any packet processing.

Factors such as the number of nodes in the network, the total number of wavelength channels, the network topology and the distribution of traffic (e.g. there may be a higher proportion of traffic between certain pairs of nodes) will determine how channels are allocated to different routes in the network.

Advantageously, nodes in the network use the channel allocation table and send bursts of packets. At some nodes it is still necessary to process packets. For example, in FIG. 8 the wavelength channel Y is used between nodes A and B and between nodes A and C. Therefore, node B must process packets and determine which packets are destined for an access network connected to node B and which packets are destined for node C. By sending packets in bursts, it is possible to significantly reduce the amount of processing at node B.

The channel allocation table can be established at each node by a control protocol on the basis of flow service level agreements that the different nodes need to support. Alternatively, the channel allocation table can be established by a management plane. The channel allocation table, shared by each node, can be computed periodically by network nodes through a distributed resource allocation mechanism or by the network manager when traffic matrix changes. In the case where the channel allocation table is computed by network nodes a control protocol supporting signalling for traffic matrix information exchanging among them is required.

In a transport network, such as a metro transport network, flow characteristics typically change over a fairly long time period and therefore it is desirable to use resource reservation mechanisms based on a flow basis rather than a burst basis. In order to support QoS required by data flows, nodes have knowledge of traffic parameters of data flows they support in order to efficiently manage traffic queuing and scheduling. In this way, the scheduler knows the output port bandwidth that it must guarantee to each flow (input queue). Such parameters are set through the management plane and network planning tools. Advantageously, traffic flows are mapped onto network paths so as to minimise the number of channels to be processed by each transport node.

Figure 10:
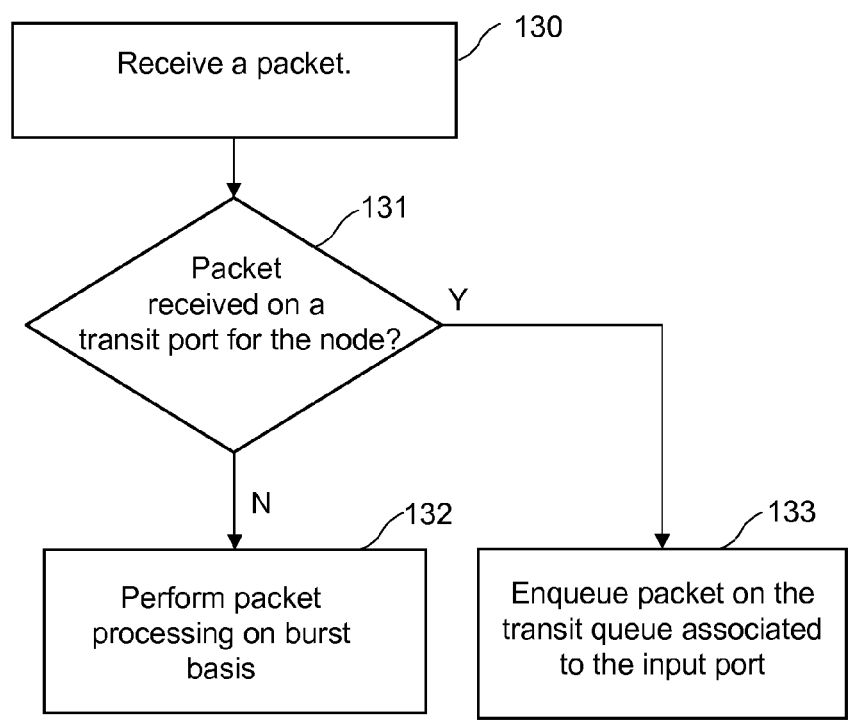
FIG. 10 shows a method of processing packets on channels at a node of a packet-based transport network.

FIG. 10 shows a method of processing packets at node 20. The method is performed by the packet/burst processor 234 shown in FIG. 3. At step 130 a packet is received at a line card of the node. The processor checks if the port on which the packet has been received is a transit port or not. It is not necessary to make a lookup in the forwarding table for each received packet as the type of traffic (transit or non-transit) is determined by the attribute of the port at which the traffic is received. A transit channel is a channel which carries traffic that is not destined for the current node 20, or any nodes in the access network 41 connected to the node 20. Step 131 checks if the packet was received on a transit channel. If the packet was not received on a transit channel it is processed as normal at step 132. If the packet was received on a transit channel it is the method proceeds to step 133. The packet is forwarded to an output interface/port specified in the Channel Allocation Table and associated to the input transit queue without processing the packet header. As an example, consider node B in FIG. 8 acting as a transit node for channel X. A first port, corresponding to a port of a particular input section of a ring card 230 of node B receives the wavelength channel X from node A. Also, a second port, corresponding to a port of a particular output section of a ring card of node B, transmits the wavelength channel X from node B to node C. Forwarding rules at node B instruct the node to forward all packets received on the first port to the second port.

Figure 11:
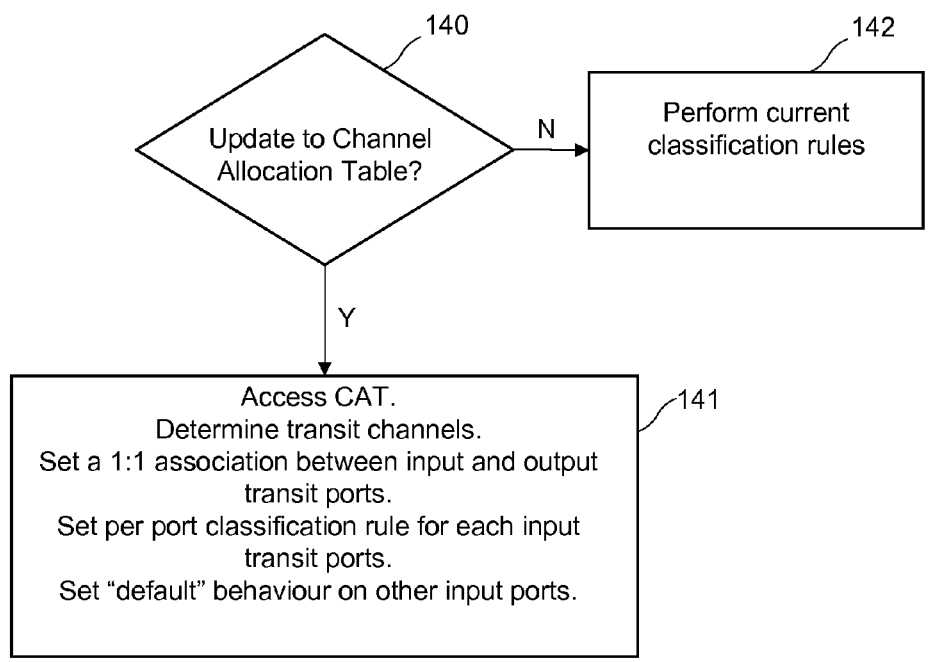
FIG. 11 shows a method of a method of controlling the forwarding behaviour of a node of a packet-based transport network.

FIG. 11 shows a method of controlling the forwarding behaviour of a node. If the Channel Allocation Table requires updating at step 140, the method proceeds to step 141 and accesses the CAT. Transit channels are determined. A 1:1 association is set between input and output transit ports. A per port classification rule is set for each input transit port. A per port classification rule requires that all packets arriving on that port must be queued on the same buffer. A transit queue for each input transit port dynamically associated to the corresponding output port must be foreseen at the input line card. All packets arriving at an input transit port are queued in its transit port and forwarded directly to the associated output port. Other, non-transit, ports operate as normal. This means that a forwarding treatment for an individual packet is determined based on information carried in the header of that packet and a forwarding treatment for a burst of packets is determined based on information carried in a burst control packet preceding the burst of packets. If the Channel Allocation Table is not updating, then a current set of classification rules are used at step 142. The "current" set of rules will have been set by a previous iteration of step 141.

When the classification rule for a given port is set, the queue for transit traffic of that port is automatically associated to the output port, so it should not be necessary to look-up in the Classification table (and not in the CAT because the access to the CAT is performed only when it changes to determine the new classification rules) for each packet.

On the input ports related to transit channels the node adopts a per-port based classification and pre-reservation of the corresponding output port bandwidth. Classification tables, including forwarding tables and handling rules for a given port, are built on the basis of the information in the channel allocation table.

The principles described above can be applied to connection-oriented networks and to connectionless networks. Packets of connectionless or connection-oriented access networks 41, 42 with the same CoS and the same transport node destination are assembled into bursts at an edge node 20 of the metro transport network 10. Across the metro networks 10 bursts of the same flow can be transported as a virtual connection or transported in a connectionless manner. When the traffic manager of a transport node has a burst waiting to be transmitted in one of its input queues it will grant sufficient bandwidth to send the burst along an output link. All of the packets of that burst will be transmitted on the same output link even if a connection was not set up for them previously.

The nodes 20 of the transport network 10 can operate in a packet-switched manner without the need for an additional underlying layer of Optical Transport Network (OTN) switching. Packet-based traffic can be transported between nodes in optical form using just the transport service of the WDM layer of the OTN. With recent improvements in the physical layer specification of 10 Gigabit Ethernet (10GE, IEEE 802.3) it is also possible to remove any need for wavelength division multiplexing of traffic, and to connect nodes 20 of the transport network using 10GE links.

In an advantageous embodiment of the invention a burst of packets is defined by a burst control packet and by inter-packet signalling. Advantageously, the burst control packet carries a field which indicates the number of packets in the burst. This information helps to estimate short term load of the queue corresponding to that destination and consequently to better manage resource allocation. In another embodiment, the BCP does not signal the number of packets in the burst and the inter-packet signalling is used to identify the size of the burst.

Embodiments of the invention are advantageously used in transport networks (e.g. metro or core networks) but can also be used in smaller-scale, or even local networks where traffic aggregation is required.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of forwarding packets at a packet forwarding node of a transport network, each packet having a header, the method comprising:
    performing a first packet forwarding mode comprising receiving packets and, for each packet, processing the header of the packet to determine a forwarding treatment for the packet and then forwarding the packet; and
    performing a second packet forwarding mode when the node identifies a group of consecutive packets, the group being destined for the same destination node of the transport network, the second packet forwarding mode comprising determining a forwarding treatment for the group of packets and forwarding the group of packets with the determined treatment and, for at least a sub-set of the group of packets, the forwarding is performed without processing the headers of the sub-set of packets, wherein the group of consecutive packets is identified by inter-packet signalling which indicates that the packet before the inter-packet signalling and the packet after the inter-packet signalling are to be treated as part of the same group.

2. A method according to claim 1 wherein the group of packets is preceded by a control packet which carries an address of the destination node on the transport network for the group of packets and the step of determining a forwarding treatment for the group of packets uses the address in the control packet.

3. A method according to claim 2 wherein the second mode of operation comprises forwarding the group of packets with the determined treatment without processing the headers of any of the group of packets.

4. A method according to claim 2 wherein the control packet comprises a flow identifier and the step of determining a forwarding treatment for the group of packets uses the flow identifier.

5. A method according to claim 2 wherein the control packet comprises a class of service identifier and the step of determining a forwarding treatment for the group of packets uses the class of service identifier.

6. A method according to claim 1, comprising:
    detecting whether a control packet, preceding the group, has been received, wherein the control packet indicates the number of packets in the group, and
    wherein if the control packet is not received the method further comprises creating a new control packet before forwarding the group of packets.

7. A method according to claim 1 further comprising:
    determining a group of packets which are destined for the same destination node of the transport network and which can receive the same forwarding treatment at subsequent nodes of the transport network; and
    forwarding the group of packets as a consecutive group of packets and identifying the group by at least one of: creating a control packet preceding the group which indicates the number of packets in the group; and adding inter-packet signalling which indicates that the packet before the inter-packet signalling and the packet after the inter-packet signalling are to be treated as part of the same group.

8. A method according to claim 1 wherein the node comprises input interfaces and output interfaces, the method further comprising:
    storing a channel allocation table at the node which indicates which input interface is a transit channel for the node; and
    forwarding packets for the transit channel without processing the headers of packets of that channel, packets for the transit channel being forwarded to an output interface corresponding to the transit channel.

9. A method according to claim 8 wherein the interfaces correspond to at least one of: optical channels and optical wavelength channels.

10. A method of forwarding packets at a forwarding node of a transport network comprising:
    receiving packets, each packet comprising a header;
    determining a group of packets which are destined for the same destination node of the transport network and which can receive the same forwarding treatment at subsequent nodes of the transport network; and
    forwarding the group of packets as a consecutive group of packets and identifying the group by adding inter-packet signalling which indicates that the packet before the inter-packet signalling and the packet after the inter-packet signalling are to be treated as part of the same group.

11. A method according to claim 10, comprising:
    identifying the group by creating a control packet preceding the group which indicates the number of packets in the group,
    wherein the control packet carries an address of the destination node on the transport network for the group of packets.

12. A method according to claim 10 further comprising selecting a size of the group based on available bandwidth.

13. A method according to claim 1 wherein the packet forwarding node is an Ethernet forwarding node and wherein the packets are Ethernet frames.

14. A packet forwarding node for a transport network, comprising:
input interfaces for receiving packet traffic, each packet comprising a header;
output interfaces for outputting packet traffic;
a switching fabric connecting the input interfaces and output interfaces; and
a packet processor which is arranged to perform:
a first forwarding mode comprising receiving packets and, for each packet, processing the header of the packet to determine a forwarding treatment for the packet and then forwarding the packet; and
a second forwarding mode comprising identifying a group of consecutive packets which are destined for the same destination node of the transport network, determining a forwarding treatment for the group of packets, forwarding the group of packets with the determined treatment and, for at least a sub-set of the group of packets, the forwarding is performed without processing the headers of the sub-set of packets, wherein the group of consecutive packets is identified by inter-packet signalling which indicates that the packet before the inter-packet signalling and the packet after the inter-packet signalling are to be treated as part of the same group.

15. A packet forwarding node for a transport network comprising:
input interfaces for receiving packet traffic, each packet comprising a header;
output interfaces for outputting packet traffic;
a switching fabric connecting the input interfaces and output interfaces; and
a packet processor which is arranged to determine a group of packets which are destined for the same destination node of the transport network and which can receive the same forwarding treatment at subsequent nodes of the transport network, forward the group of packets as a consecutive group of packets and identify the group by adding inter-packet signalling which indicates that the packet before the inter-packet signalling and the packet after the inter-packet signalling are to be treated as part of the same group.

16. A nontransitory processor readable medium having stored thereon instructions for causing a processor to perform a method of forwarding packets at a packet forwarding node of a transport network, each packet having a header, the method comprising:
performing a first packet forwarding mode comprising receiving packets and, for each packet, processing the header of the packet to determine a forwarding treatment for the packet and then forwarding the packet; and
performing a second packet forwarding mode when the node identifies a group of consecutive packets, the group being destined for the same destination node of the transport network, the second packet forwarding mode comprising determining a forwarding treatment for the group of packets and forwarding the group of packets with the determined treatment and, for at least a sub-set of the group of packets, the forwarding is performed without processing the headers of the sub-set of packets, wherein the group of consecutive packets is identified by inter-packet signalling which indicates that the packet before the inter-packet signalling and the packet after the inter-packet signalling are to be treated as part of the same group.

* * * * *